(12) United States Patent
Huang et al.

(10) Patent No.: US 7,339,335 B2
(45) Date of Patent: Mar. 4, 2008

(54) BRAKE SYSTEM AND METHOD FOR A DC BRUSH MOTOR WITHOUT A HALL SENSOR

(75) Inventors: Hsing Sheng Huang, Feng Yuan (TW); Wen Chun Feng, Taipei (TW)

(73) Assignee: Sunplus Technology Co., Ltd., Hsin-chu (TW)

( * ) Notice: Subject to any disclaimer, the term of this patent is extended or adjusted under 35 U.S.C. 154(b) by 93 days.

(21) Appl. No.: 11/416,189

(22) Filed: May 3, 2006

(65) Prior Publication Data

US 2006/0250098 A1    Nov. 9, 2006

(30) Foreign Application Priority Data

May 4, 2005    (TW) ................................ 94114344 A

(51) Int. Cl.
*H02P 1/18* (2006.01)
(52) U.S. Cl. ..................... 318/254; 318/138; 318/439; 318/362
(58) Field of Classification Search ............... 318/254, 318/138, 439, 362, 366, 367
See application file for complete search history.

(56) References Cited

U.S. PATENT DOCUMENTS

| | | | | |
|---|---|---|---|---|
| 3,617,836 A | * | 11/1971 | Henry | ........................ 318/261 |
| 4,962,338 A | * | 10/1990 | Daggett et al. | ........ 318/568.11 |
| 4,969,756 A | * | 11/1990 | Villec et al. | ................ 388/815 |
| 6,326,757 B1 | * | 12/2001 | Aoki et al. | ................ 318/599 |
| 2004/0002775 A1 | * | 1/2004 | Kerner et al. | ................ 700/28 |
| 2004/0022153 A1 | | 2/2004 | Shen | |

* cited by examiner

*Primary Examiner*—Rina Duda
(74) *Attorney, Agent, or Firm*—Birch, Stewart, Kolasch & Birch, LLP.

(57) ABSTRACT

A brake system and method for a direct current brushed motor without a Hall sensor are provided. After the system is activated, the motor is pre-braked in order to detect and record the stationary armature current while the motor is in a stationary state. As the motor is required to be braked, a reverse control voltage is generated and then the armature current value is detected. When the detected armature current value is equal to the stationary armature current value, the operation of braking the DC brush motor is accomplished. The invention can achieve the goal of braking the motor to a stop quickly, no matter which state the motor is in. Besides, it can be applied to different kinds of motors.

14 Claims, 6 Drawing Sheets

BRAKE SYSTEM AND METHOD FOR A DC BRUSH MOTOR WITHOUT A HALL SENSOR

This application claims the benefit of the filing date of Taiwan Application Ser. No. 094114344, filed on May 4, 2005, the content of which is incorporated herein by reference.

BACKGROUND OF THE INVENTION

1. Field of the Invention

The present invention generally relates to a brake system and method for a DC brush motor. More specifically, the present invention relates to a brake system and method for a DC brush motor without a Hall sensor.

2. Description of the Related Art

A conventional brush-less motor control system acquires a frequency generator signal directly from an installed Hall sensor or through an external chip using three-phase control signal. A decrease to zero voltage of the frequency generator signal represents the motor having come to a stop. On the other hand, brush motors with Hall devices characterized by easy control and generating feedback signals used to be prevailed but cannot meet the requirement of cost reduction. This creates a big demand of DC motors of simpler structures without Hall devices. However, many problems emerged as a result of the application with the motors. One of them is concerning the braking of the motor.

Ordinarily, there are two ways to brake a motor. First way is to stop providing current to the motor immediately, so that the motor loses energy and drags to a stop. But, it takes much time to make a complete stop and fails to meet the requirements of use in some applications. Second way is to provide the motor with a reverse current. Therefore, a greater deceleration is applied to complete the brake operation quickly. However, in a DC motor system without frequency generator signals feedback, it cannot be easily detected if the motor is in the stationary state. Moreover, it may result in advancing the brake operation, or even over-braking to cause the motor reversed according to the amount of the load.

FIG. 1 is a block diagram of a conventional brush-less DC motor with a Hall sensor. Referring to FIG. 1, the conventional brush-less DC motor system 100 with a Hall sensor directly detects and feedbacks the rotating speed of the motor. The processing unit 101 drives a DC brush-less motor 103 through a motor driver 102. As the motor 103 starts to rotate, the frequency generator signal is generated by the motor driver 102 and then provided to the processing unit 101 for rotating speed control and brake control. However, a prohibitive cost and sophisticated circuitry are characteristic of the system 100.

U.S. Patent Pub. No. 20040022153 (Shen) discloses a rotating speed control apparatus and method for a DC motor without a Hall sensor, by detecting the armature current of the motor and then calculating coefficients and rotating speed of the motor. The compatibility of this method is poor because it needs to use different mathematic operations for motor coefficients with different motors. Besides, it also uses a differential amplifier to calculate the armature current, but there are still problems with resistor matching and noise interference. Therefore, the calculated armature currents are prone to errors. Accordingly, coefficients and rotating speed of the motor derived from substituting the calculated armature currents into equations are even less accurate. Moreover, the method is used to calculate coefficients and rotating speed of the motor, but doesn't disclose how to perform the brake control.

SUMMARY OF THE INVENTION

In view of the above-mentioned problems, an object of the invention is to provide a brake method for a DC brush motor without a Hall sensor.

To achieve the above-mentioned object, the brake method for a DC brush motor without a Hall effect includes the following two steps: (1) Detect a armature current value as a stationary armature current value after pre-braking a DC brush motor without a Hall sensor. (2) Brake the motor and simultaneously detect the armature current value of the motor until the armature current value equals the stationary armature current value after receiving a brake command.

A unique feature of the present invention is that the motor can be braked to a stop in a very short time no matter which state the motor is in. Moreover, it can be applied to different DC brush motors and avoids the influences on the circuits caused by the deviation of the devices, the drift of circuits and different kinds of motors.

DETAILED DESCRIPTION OF THE INVENTION

The brake method and system for a DC brush motor of the invention will be described with reference to the accompanying drawings.

Figure 1:
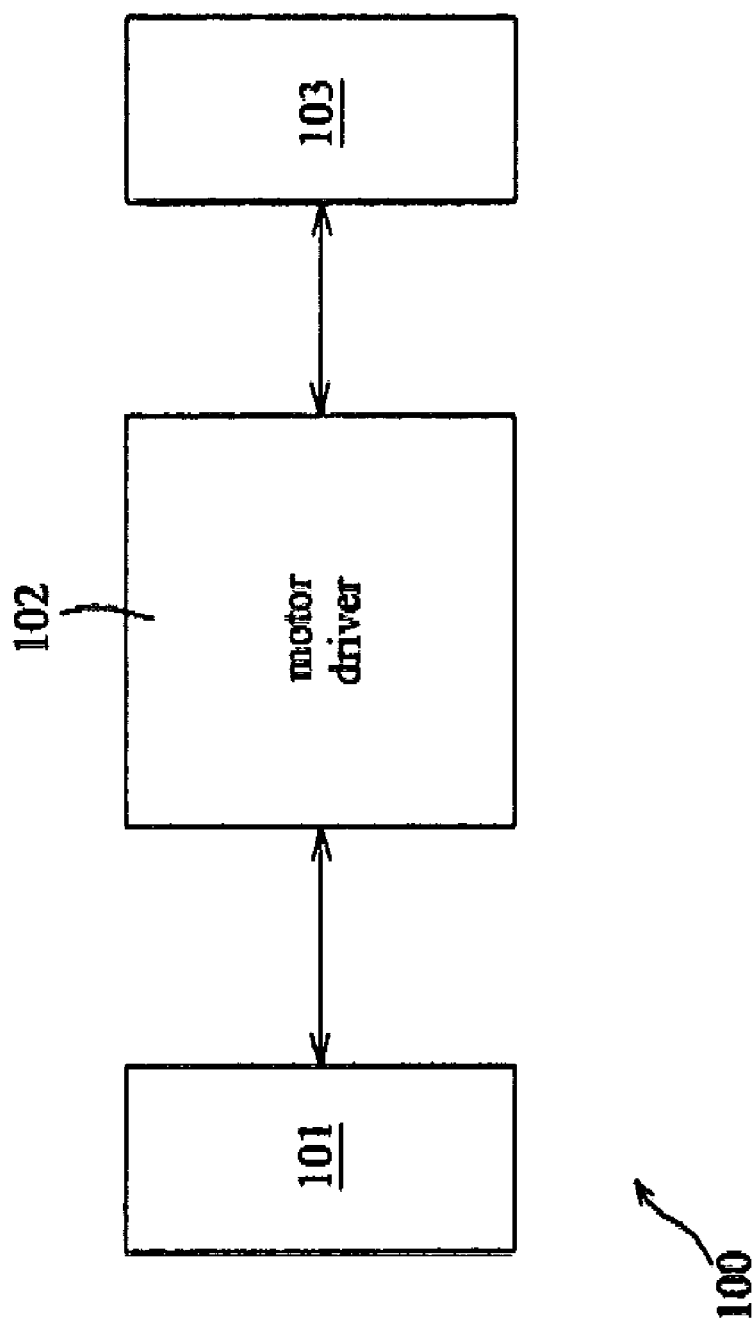
FIG. 1 is a block diagram of a conventional brush-less DC motor with a Hall sensor.
Figure 2:
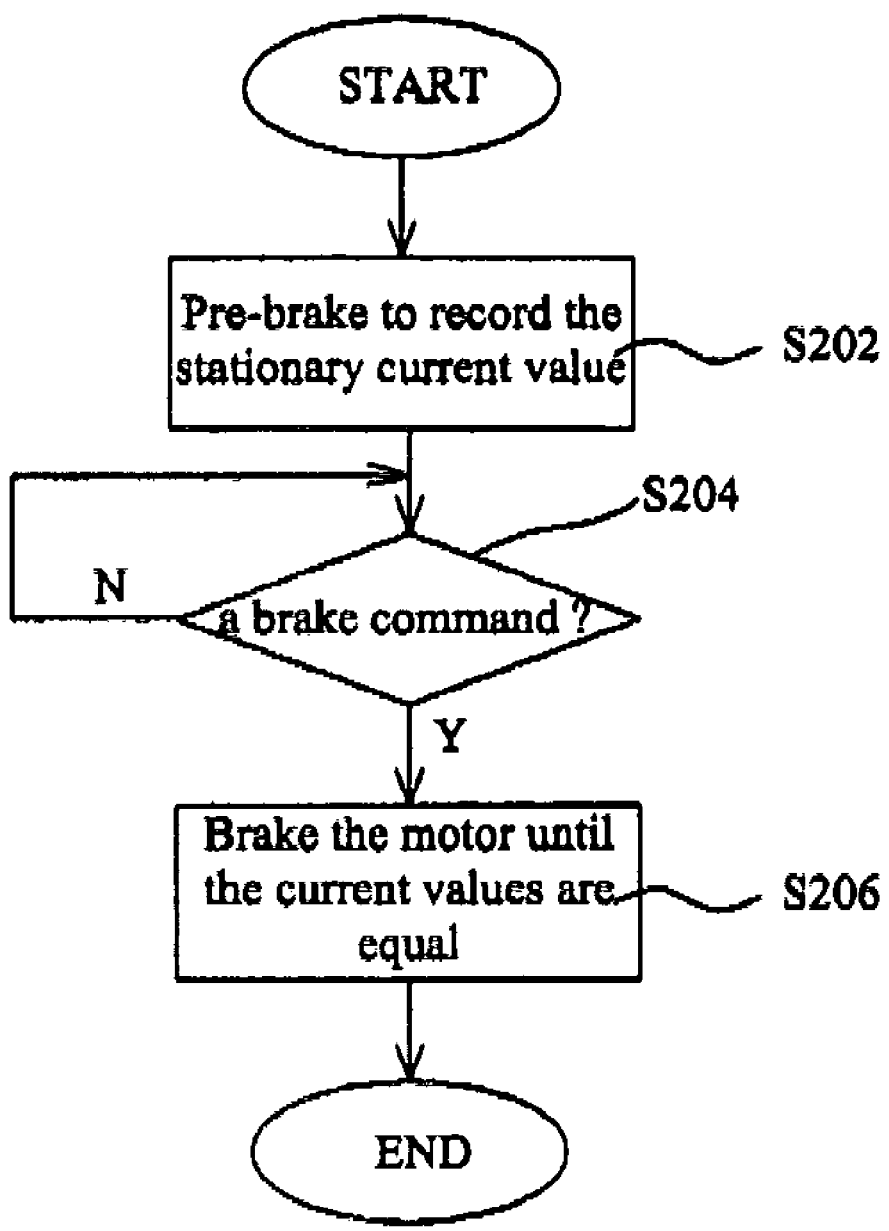
FIG. 2 is a flow chart illustrating the brake method for a DC brush motor according to the invention.

FIG. 2 is a flow chart illustrating the brake method for a DC brush motor according to the invention. First, in step S202, after a DC brush motor without a Hall sensor is pre-braked, an armature current value is detected as a stationary armature current value. Next, in step S204, it is checked whether a brake command is received. If the brake command is received, flow advances to step S206. If not, the check operation in step S204 is repeated. Finally, in step S206, the brake operation is performed and simultaneously the armature current value of the motor is detected until the armature current value equals the stationary armature current value. It should be noted that step S202 is executed only once during the system initialization.

By detecting the armature current value of the DC brush motor, it is determined if there is a current generated by the back electromotive force resulted from the rotation of the motor. During the system initialization, the motor is first pre-braked and then the stationary armature current value is detected and recorded while the motor is at rest. While required to be braked, the motor is decelerated quickly by applying the reverse current. At this time, the armature current value is consecutively detected and compared with the stationary armature current value. When the armature current value equals the stationary armature current value, it indicates the motor is in a stationary state and no more reverse current is provided. Two equal current values represent two equal back electromotive forces caused by the rotation of the motor. Thus, the motor rotates at the same rotating speed as the motor is pre-braked (in the stationary state), which means the rotating speed is zero. And, the brake operation of the DC brush motor is accomplished.

Figure 3:
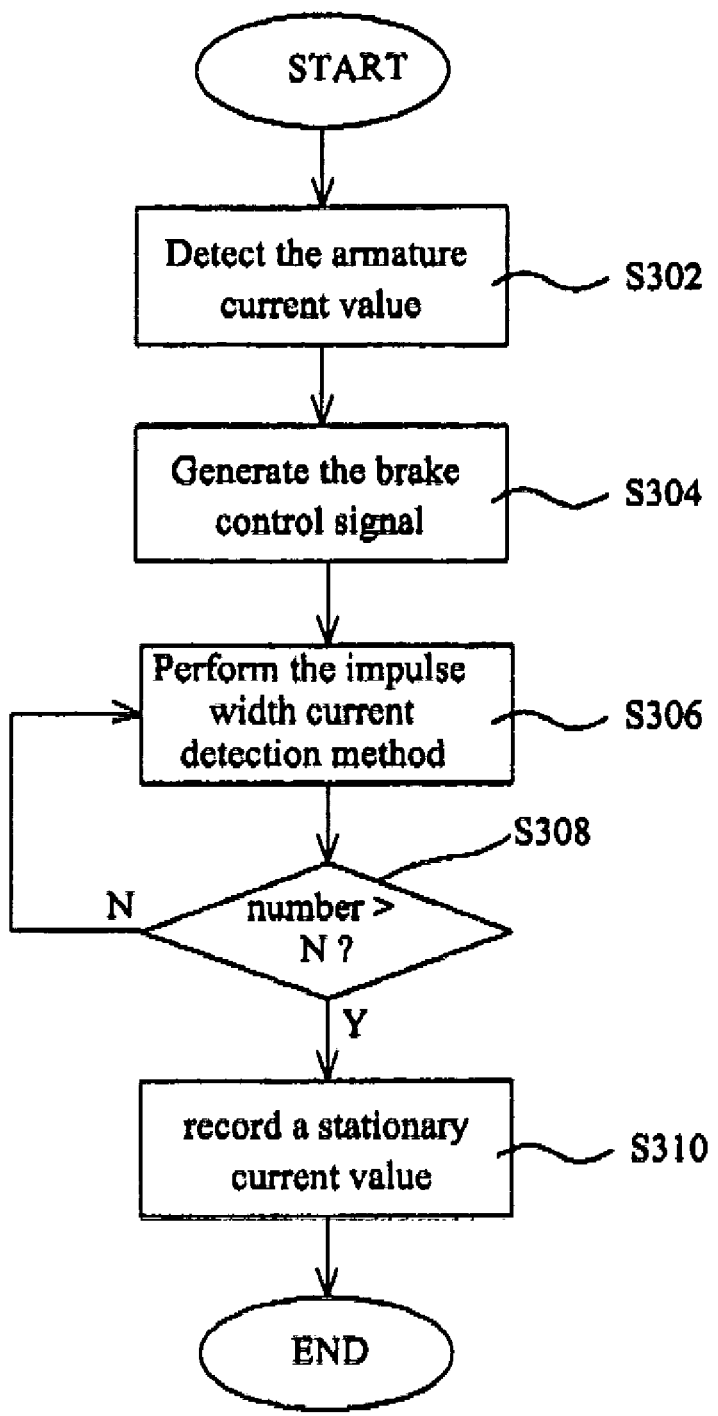
FIG. 3 is a flow chart illustrating the pre-braking step of FIG. 2.

FIG. 3 is a flow chart illustrating the pre-braking step of FIG. 2. The pre-braking step in accordance with FIG. 3 is detailed as follows:

Step S302: Detect the armature current value of the motor.

Step S304: Generate a periodic brake control signal having a reverse voltage to decelerate the motor based on the detected armature current value in step S302.

Step S306: Detect the armature current value. The armature current value of the motor is detected when the periodic brake control signal is at the low voltage level. It is the impulse width current detection method, which will be described later. The periodic brake control signal is at the low voltage level, which means the voltage of the periodic brake control signal is zero, or the periodic brake control signal is in a state without voltage applied.

Step S308: Check if the same armature current value has been detected for N (N is a positive integer) successive times. If the same armature current value has been detected for N successive times, flow advances to step 310. If not, flow returns to step S306.

Step S310: Stop generating the periodic brake control signal and record the detected armature current value as the stationary armature current value.

During the deceleration of performing the pre-braking operation, the armature current value is detected using the impulse width current detection method. The impulse width current detection method is detailed thereinafter.

Figure 4:
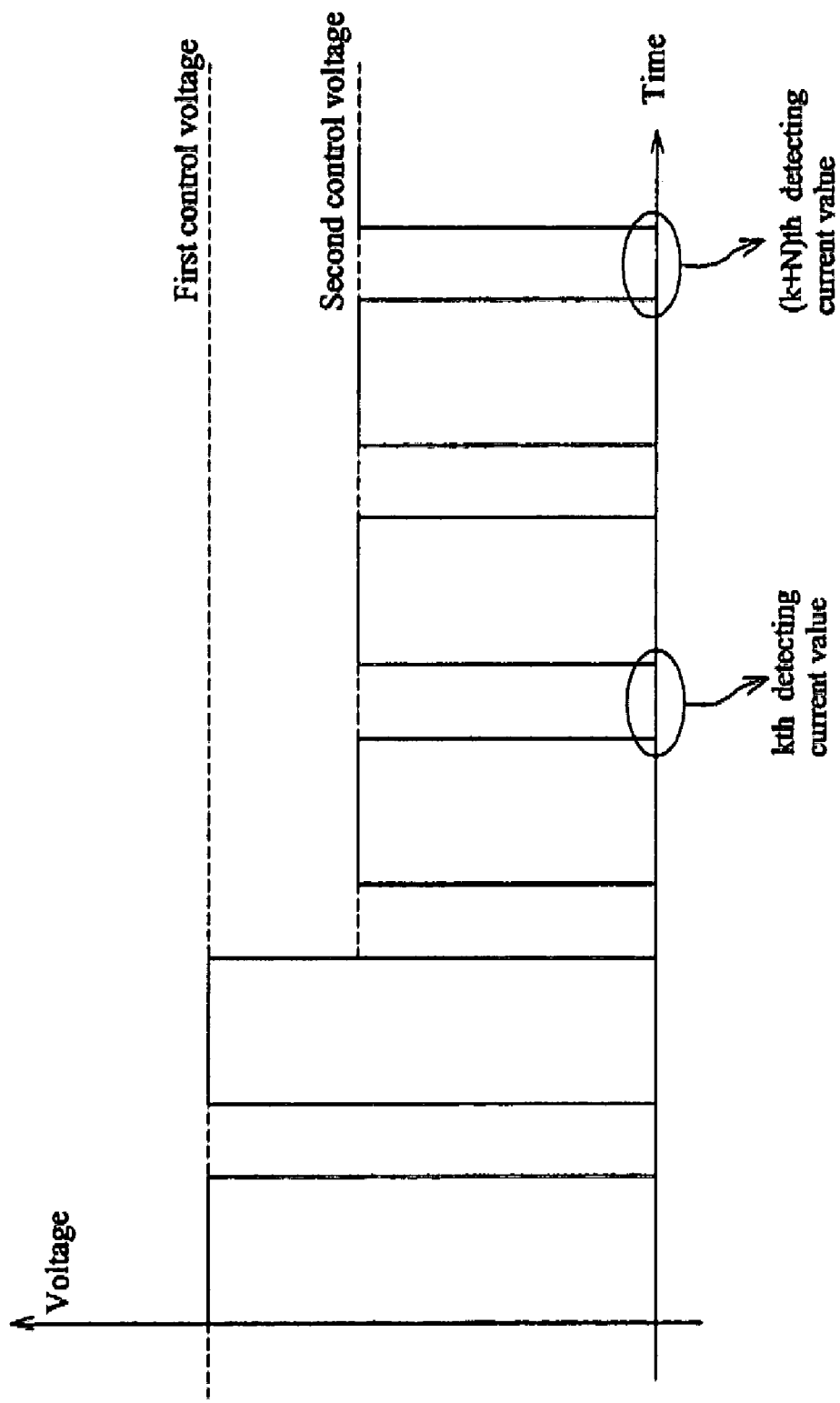
FIG. 4 is the output waveforms of the brake control signal used in the impulse width current detection method.

FIG. 4 is the output waveforms of the brake control signal used in the impulse width current detection method. With referring to FIG. 4, the brake control signal is a periodic clock signal. In each impulse cycle, a control voltage, which is a first or a second control voltage (i.e. reverse voltage or high voltage) as shown in FIG. 4, is output for one period of the impulse cycle. No control voltage is output for the rest of the impulse cycle. (The brake control signal is low-voltage or in a state without voltage applied or zero-voltage.) When no control voltage is output, the current of the motor is completely caused by the back electromotive force of the motor and it is time to perform the current detection. Suppose the current has been detected for k (k is a positive integer) times. If the same armature current value has been detected for the following N successive times, it denotes that there is no variation in rotating speed for a long period. Accordingly, it is determined that the rotating speed is down to zero. During the current detection, the control voltage is varied with the difference between the successive armature current values. For instance, a greater control voltage (e.g. the first control voltage) is provided if the difference between the successive armature current values is getting greater. A less control voltage (e.g. the second control voltage) is provided while the difference between the successive armature values is getting less.

Figure 5:
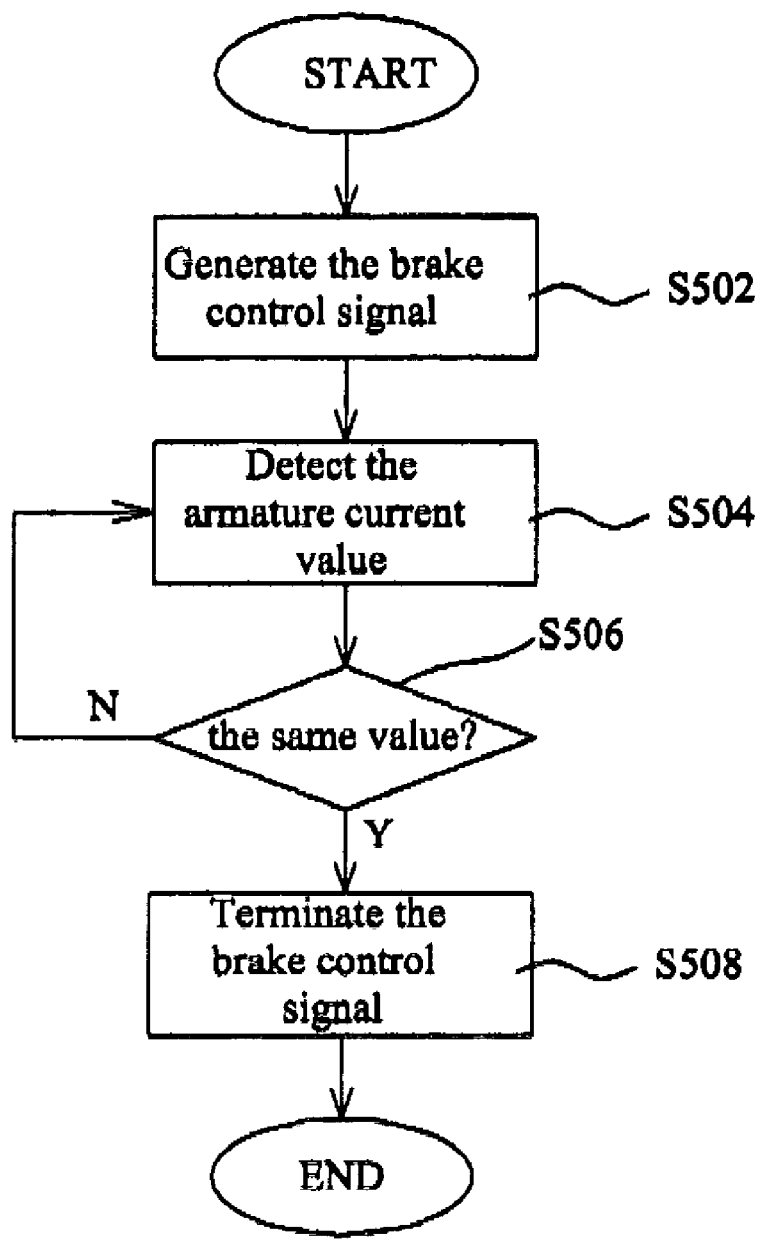
FIG. 5 is a flow chart outlining a method for performing the brake operation shown in FIG. 2 according to the invention.

FIG. 5 is a flow chart outlining a method for performing the brake operation shown in FIG. 2 according to the invention.

Step S502: Generate a periodic brake control signal having a reverse voltage.

Step S504: Detect the armature current value of the motor while the voltage of the brake control signal is zero.

Step S506: Check if the detected armature current value is equal to the stationary armature current value. If equal, flow advances to step S508. If not, flow returns to step S504.

Step S508: Terminating the brake control signal as the motor is finally stationary.

In each impulse cycle of the brake control signal, a control voltage is applied for one period of the impulse cycle and zero-voltage is applied for the rest of the impulse cycle in order to detect the armature current value, which is the sum of the stationary armature current value of the motor in a stationary state plus the current resulted from the back electromotive forces generated by the rotation of the DC motor. It represents that the back electromotive force generated by the DC motor is equal to zero and that the motor is in a stationary state if the detected armature current value equals the stationary armature current value of the motor in a stationary state.

It should be noted that continuously supplying the control voltage to the motor without detecting the armature current value may cause the reverse rotation of the motor whenever in the pre-braking step or in the braking step. Based on the feature that the operating speed of the circuit is far faster the speed of mechanical response of the motor, the invention closely monitors the armature current values of the motor in the pre-braking step or in the braking step, thereby precisely controlling all the braking procedures.

Figure 6:
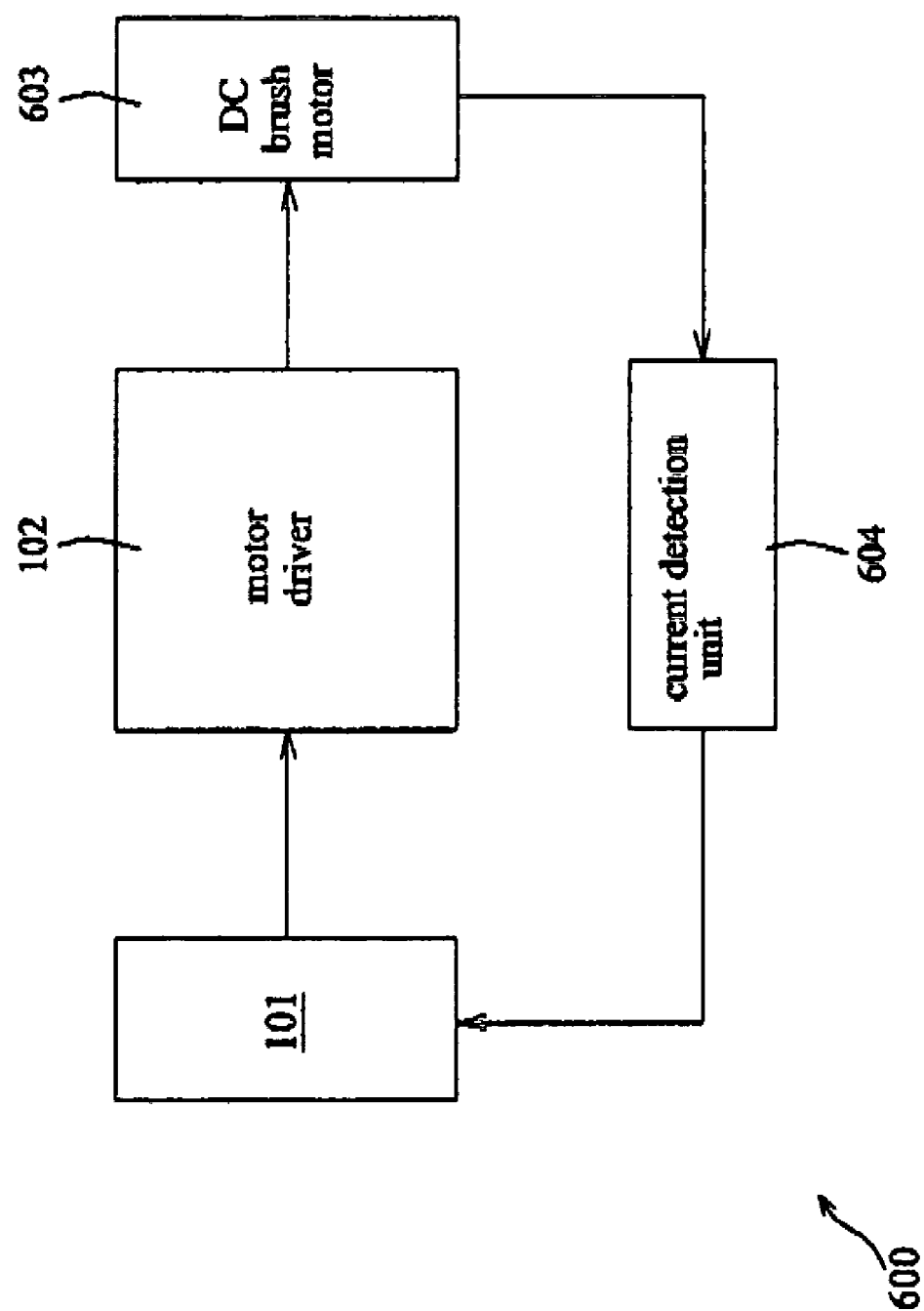
FIG. 6 is a block diagram of a brake system for a DC brush motor without a Hall sensor according to the invention.

FIG. 6 is a block diagram of a brake system for a DC brush motor without a Hall sensor according to the invention. The brake system 600 includes a processing unit 101, a motor driver 102, a DC brush motor 603, and a current detection device 604. The processing unit 101 generates a periodic brake control signal having reverse voltage in response to a brake command. After having received the periodic brake control signal, the motor driver 102 generates a motor drive signal to drive the DC brush motor 603. The current detection device 604 detects the armature current value of the DC brush motor during the low voltage level of each cycle of the periodic brake control signal, and outputs the armature current value to the processing unit 101.

Moreover, after having received a pre-brake command or a brake command, the processing unit 101 adjusts the voltage level of the periodic brake control signal in further accordance with the armature current value detected by the current detection device 604. For example, a greater voltage of the brake control signal is provided as the difference between the successive armature current values is getting greater. Contrarily, a less voltage of the brake control signal is provided while the difference between the successive armature values is getting less.

Wherein, the processing unit 101 can be implemented utilizing a general central processing unit, and the current detection device 604 can be implemented utilizing a resistor and an operational amplifier circuit.

Hence, the invention can be applied to different kinds of DC brush motors and avoids the influences on the circuits caused by the deviation of the devices, the drift of circuits and different kinds of motors.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A brake method for a DC brush motor without a Hall sensor, comprising the steps of:
   detecting an armature current value as a stationary armature current value when a periodic brake control signal is in the logic low state after pre-braking the DC brush motor; and
   braking the DC brush motor and simultaneously detecting the armature current value of the DC brush motor until the armature current value equals the stationary armature current value when the periodic brake control signal is in the logic low state after receiving a brake command.

2. The brake method as claimed in clam 1, wherein the step of detecting a armature current value as a stationary armature current value comprises the steps of:
   detecting the armature current value of the DC brush motor;
   generating the periodic brake control signal according to the armature current value, and detecting the armature current value of the DC brush motor when the periodic brake control signal is in the logic low state; and
   terminating the periodic brake control signal and recording the armature current value as the stationary armature current value if the same armature current value has been detected for N successive times.

3. The brake method as claimed in clam 2, wherein the logic low state of the periodic brake control signal is in a state without voltage applied.

4. The brake method as claimed in clam 2, wherein the voltage of the logic low state of the periodic brake control signal is zero.

5. The brake method as claimed in clam 2, wherein the voltage of the periodic brake control signal varies in accordance with the difference between the successive armature current values.

6. The brake method as claimed in clam 1, wherein the step of braking the motor comprises the steps of:
   generating the periodic brake control signal;
   detecting the armature current value of the DC brush motor when the periodic brake control signal is in the logic low state; and
   comparing the armature current value of the motor with the stationary armature current value until the armature current value equals the stationary armature current value before terminating the periodic brake control signal.

7. The brake method as claimed in clam 6, wherein the voltage of the periodic brake control signal varies in accordance with the difference between the successive armature current values.

8. A brake system for a DC brush motor without a Hall sensor, comprising:
   a processing unit for generating a periodic brake control signal in response to a brake command;
   a motor driver for receiving the periodic brake control signal and generating a motor drive signal;
   a DC brush motor for receiving the motor drive signal; and
   a current detection device for detecting an armature current value of the DC brush motor and outputting the armature current value to the processing;
   wherein the processing unit terminates the periodic brake control signal if the armature current value equals a stationary armature current value.

9. The brake system as claimed in clam 8, wherein the processing unit regulates the voltage of the periodic brake control signal in accordance with the armature current value.

10. The brake system as claimed in clam 8, wherein the processing unit is implemented utilizing a central processing unit.

11. A brake method for a DC brush motor without a Hall sensor, comprising the steps of:
   detecting an armature current value after pre-braking the DC brush motor;
   generating a periodic brake control signal according to the armature current value, and detecting the armature current value of the DC brush motor when the periodic brake control signal is in the logic low state;
   terminating the periodic brake control signal and recording the armature current value as a stationary armature current value if the same armature current value has been detected for N successive times;
   generating the periodic brake control signal to brake the DC brush motor after receiving a brake command;
   detecting the armature current value of the DC brush motor when the periodic brake control signal is in the logic low state; and
   comparing the armature current value of the motor with the stationary armature current value until the armature current value equals the stationary armature current value before terminating the periodic brake control signal.

12. The brake method as claimed in clam 1, wherein the logic low state of the periodic brake control signal is in a state without voltage applied.

13. The brake method as claimed in clam 1, wherein the voltage of the logic low state of the periodic brake control signal is zero.

14. The brake method as claimed in clam 1, wherein the voltage of the periodic brake control signal varies in accordance with the difference between the successive armature current values.

* * * * *